(12) United States Patent
Kim et al.

(10) Patent No.: US 10,267,649 B2
(45) Date of Patent: Apr. 23, 2019

(54) METHOD AND APPARATUS FOR CALCULATING AZIMUTH

(71) Applicant: MagnaChip Semiconductor, Ltd., Cheongju-si (KR)

(72) Inventors: Dong Ho Kim, Cheongju-si (KR); Ki Seok Cho, Cheongju-si (KR)

(73) Assignee: MagnaChip Semiconductor, Ltd., Cheongju-si (KR)

(*) Notice: Subject to any disclaimer, the term of this patent is extended or adjusted under 35 U.S.C. 154(b) by 620 days.

(21) Appl. No.: 14/243,643

(22) Filed: Apr. 2, 2014

(65) Prior Publication Data
US 2015/0032409 A1 Jan. 29, 2015

(30) Foreign Application Priority Data
Jul. 24, 2013 (KR) .................. 10-2013-0087663

(51) Int. Cl.
*G01C 17/28* (2006.01)
*G01C 25/00* (2006.01)

(52) U.S. Cl.
CPC ............. *G01C 25/00* (2013.01); *G01C 17/28* (2013.01)

(58) Field of Classification Search
None
See application file for complete search history.

(56) References Cited

U.S. PATENT DOCUMENTS

| | | | |
|---|---|---|---|
| 6,651,003 B2 * | 11/2003 | Woloszyk | G01C 17/38 33/356 |
| 6,937,954 B2 | 8/2005 | Jeong et al. | |
| 7,177,779 B2 | 2/2007 | Hikida et al. | |
| 7,210,235 B2 | 5/2007 | Sato | |
| 7,340,362 B2 | 3/2008 | Kitamura et al. | |
| 7,451,549 B1 * | 11/2008 | Sodhi | G01C 17/38 33/356 |
| 2002/0060570 A1 * | 5/2002 | Shirasaka | E21B 47/022 324/338 |
| 2004/0254727 A1 * | 12/2004 | Ockerse | G01C 17/28 701/535 |
| 2004/0267505 A1 * | 12/2004 | Jeong | G01C 17/00 702/189 |
| 2006/0190174 A1 * | 8/2006 | Li | G01C 17/38 701/530 |
| 2012/0078562 A1 * | 3/2012 | Yamada | G01C 17/28 702/95 |
| 2012/0296596 A1 * | 11/2012 | Profitt | G06F 3/0346 702/104 |

FOREIGN PATENT DOCUMENTS

CN 1573287 A 2/2005

* cited by examiner

*Primary Examiner* — Alexander Satanovsky
*Assistant Examiner* — Brent A. Fairbanks
(74) *Attorney, Agent, or Firm* — NSIP Law (57) ABSTRACT

A method and an apparatus for calculating azimuth, and a method and an apparatus for determining an offset from geomagnetic field are provided. An apparatus for calculating azimuth includes a magnetic sensor configured to sense magnetic field, a data selecting unit configured to select offset data items, an offset calculating unit configured to calculate an offset by a geometrical method that uses the selected offset data items, and an azimuth calculating unit configured to calculate an azimuth by using the calculated offset.

20 Claims, 3 Drawing Sheets

METHOD AND APPARATUS FOR CALCULATING AZIMUTH

CROSS-REFERENCE TO RELATED APPLICATIONS

This application claims the benefit under 35 USC 119 (a) of Korean Patent Application No. 10-2013-0087663 filed on Jul. 24, 2013, in the Korean Intellectual Property Office, the entire disclosure of which is incorporated herein by reference for all purposes.

BACKGROUND

1. Field

The following description relates to a method and an apparatus for calculating azimuth, a method and an apparatus for determining an offset, and a method and apparatus for calculating azimuth that involves calculating an azimuth by removing offset components from a measured magnetic field.

2. Description of Related Art

An azimuth measuring apparatus may be used to calculate an azimuth to determine a location or a direction with high accuracy. An azimuth measuring apparatus may calculate the azimuth by determining the geomagnetic field of the Earth. To calculate the azimuth, a true north determined by the geomagnetic field (a normal magnetic field) and the measured north as determined by a compass or measuring equipment at any given location based on the local magnetic fields are distinguished. The magnetic field measured at a given location includes abnormal magnetic fields generated by components other than the geomagnetic field. To obtain accurate direction information, the azimuth measuring apparatus may determine the geomagnetic field without the deviation or offset caused by the abnormal magnetic field. The deviation resulting from the abnormal magnetic field is calculated as an offset from a reference point by using an appropriate method based on a measured magnetic data group. With the calculated offset, it is possible to obtain a desired geomagnetic value by subtracting the offset from a measured magnetic value at a given location on the Earth's surface.

This offset is greatly changed depending on whether a magnetic body is nearby. Such a magnetic body may include, for example, a memory card, a CPU, a speaker, or a coil that are included in and may be in operation in the azimuth measuring apparatus. If the offset is not taken into account, a user of the azimuth measuring apparatus may determine that a calculated value of the offset is not appropriate and may intentionally ask for re-calculation.

Korea Patent Laid-Open Application No. 10-2006-0036078 describes an azimuth measuring apparatus and an azimuth measuring method for rapidly calculating a high precise offset depending on circumstances from a magnetic data group acquired to measure an azimuth.

However, in such a conventional azimuth measuring apparatus and azimuth measuring method, there are problems that a large amount of 2-axis or 3-axis data items are required. Further, as a statistical analysis is used to calculate the azimuth, an amount of memory usage is high and a response speed is slow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an azimuth calculating apparatus includes a magnetic sensor configured to sense magnetic field, a data selecting unit configured to select offset data items, an offset calculating unit configured to calculate an offset by a geometrical method that uses the selected offset data items, and an azimuth calculating unit configured to calculate an azimuth by using the calculated offset.

The general aspect of the azimuth calculating apparatus may further include a median filter unit configured to remove noise from the magnetic field.

The data selecting unit may be configured to select at least three or more data items as the selected offset data items.

The data selecting unit may be configured to use two values, which are a value having the greatest difference in distance between data items in a measured data group and a value having the second greatest difference, as main-calculation data items, and uses at least one data item between the two values as sub-calculation data.

The offset calculating unit may be configured to set one point that is far away from the sub-calculation data, among intersecting points of two circles having the two main-calculation data items as centers and each having a radius r, as a new offset reference point.

The general aspect of the apparatus may further include an offset calculation assisting unit configured to, in response to a data presently measured being determined not to correspond to geomagnetic field and previous data being determined to correspond to the geomagnetic field, calculate the offset by subtracting a difference between the presently measured data and the previous data from a previous offset reference point and setting the resultant value as a new offset reference point.

The general aspect of the apparatus may further include an amplifying unit configured to amplify a voltage of the magnetic field sensed by the magnetic sensor, an analog-to-digital (A/D) converting unit configured to convert the amplified voltage into a digital value, a chopping control unit configured to reduce an offset of the voltage, a magnetic field separating unit configured to separate the voltage into 3-axis magnetic field components in X, Y, and Z axes and to transmit the separated 3-axis magnetic field components to the median filter unit, and a magnetic field inspecting unit configured to determine whether or not the magnetic field corresponds to the geomagnetic field, to calculate the azimuth without updating a new offset in response to a determination that the magnetic field is the geomagnetic field, and to calculate the offset in response to a determination that the magnetic field is not the geomagnetic field.

In another general aspect, an azimuth calculating method may involve selecting offset data in response to output data not corresponding to geomagnetic field, calculating an offset by using the selected offset data, determining whether or not the offset is within a range of variation in the offset, and applying the offset in response to the offset being within a range of a preset reference value and not applying the offset in response to the offset being outside the range of the reference value, and calculating an azimuth by using the calculated offset.

In the selecting of the offset data, two values, which are a value having the greatest difference in distance between data items in a measured data group and a value having the second greatest difference, are used as main-calculation data items, and at least one data item between the two values is used as sub-calculation data.

In the selecting of the offset data, data items that are sequentially input may be arranged in order of size, and a middle data item may be selected to remove the noise.

The selected offset data items are at least three or more data items.

The selecting of the three data items may involve storing a predetermined number of 2-axis or 3-axis data items, calculating $X_{diff}$ and $Y_{diff}$ by performing an operation of the following equation 1 by using the stored plurality of data items, selecting two data items having the largest value and the second largest value from among the $X_{diff}$ and the $Y_{diff}$ and selecting the two data items as main-calculation data items C and D; in response to the $X_{diff}$ being selected, selecting data having an X value closest to $X_{avg}$, and in response to the $Y_{diff}$ being selected, selecting data having a Y value closest to $Y_{avg}$, and selecting the data selected as the data closest to the $X_{avg}$ or the $Y_{avg}$ as sub-calculation data E, in accordance with equations:

$$X_{diff}=X_{max}-X_{min},$$

$$Y_{diff}=Y_{max}-Y_{min},$$

$$X_{avg}=(X_{max}+X_{min})/2,$$

$$Y_{avg}=(Y_{max}+Y_{min})/2,$$

wherein $X_{max}$, $X_{min}$, $Y_{max}$, and $Y_{min}$ are output values of a median filter unit, and $X_{avg}$ and $Y_{avg}$ are average values.

The calculating of the offset by using the selected three data may involve calculating distances r between a changed offset reference point B and the main-calculation data item C and between the changed offset reference point B and the main-calculation data item D, forming a circle having the main-calculation data C as a center and a radius r and a circle having the main-calculation data D as a center and a radius r, and setting one point of intersecting points a1 and a2 of the circles as an offset reference point, and in response to coordinates of the main-calculation data C being $X_1$ and $Y_1$, coordinates of the main-calculation data D are $X_2$ and $Y_2$, coordinates of the changed offset reference point B are $^OX$ and $^OY$, and coordinates of the sub-calculation data E are $X_3$ and $Y_3$, calculating as an offset a data that is data having a distance father from the sub-calculation data E, of roots a1 and a2 of equations obtained from the following equations: $(X_1-^OX)^2+(Y_1-^OY)^2=r^2$, and $(X_2-^OX)^2+(Y_2-^OY)^2=r^2$.

The general aspect of the method may further involve assisting an offset calculation, wherein, with data that is presently measured being represented as $C_1(X_c, Y_c)$ and data which is previously measured is represented as $P_1(X_p, Y_p)$, in response to a determination that the P1 is the geomagnetic field and the $C_1$ is not the geomagnetic field, the offset is calculated by subtracting $(X_c-X_p)$ and $(Y_c-Y_p)$ from the offset reference point by using the equation $(X_c-X_p)^2+(Y_c-Y_p)^2>a^2$ and then setting the resultant value as a new offset.

The output data may be obtained by measuring the magnetic field, separating the measured magnetic field into the 3-axis magnetic field of X, Y, and Z axes, and then removing noise from the 3-axis magnetic field.

In another general aspect, a method of determining an offset from geomagnetic field involves measuring magnetic field with a magnetic sensor, selecting offset data items for calculating an offset, and calculating the offset by applying a geometric method to the selected offset data item.

The method may further involve separating the measured magnetic field into components along two or more axes to obtain a collected data group.

The method may further involve removing noise from a collected data group of measured magnetic field by selecting a median value or a value substantially in middle in magnitude in the collected data group to form a measured data group.

The selecting may involve selecting at least three data items, the three data items comprising two values having the greatest difference and the second greatest difference in distance between data items in a measured data group, and a value between the two values.

The method may further involve providing the calculated offset to calculate an azimuth from a measured magnetic field.

In another general aspect, a non-transitory computer recording medium has recorded thereon an instruction to cause a computer to perform the method described above.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
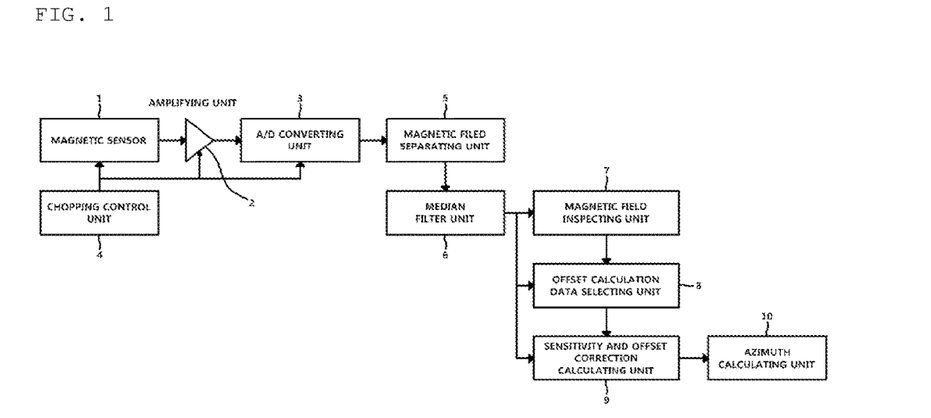
FIG. 1 is a block diagram illustrating an example of an azimuth calculating apparatus.

FIG. 1 is a block diagram illustrating an example of an azimuth calculating apparatus.

Referring to FIG. 1, in the azimuth calculating apparatus according to one example, the apparatus includes a magnetic sensor 1, an amplifying unit 2, an analog-to-digital (A/D) converting unit 3, a chopping control unit 4, a magnetic field separating unit 5, an median filter unit 6, a magnetic field inspecting unit 7, an offset calculation data selecting unit 8, a sensitivity and offset correction calculating unit 9, and an azimuth calculating unit 10.

In the event that a magnetic field is applied to the azimuth calculating apparatus, the magnetic field is converted into a voltage by the magnetic sensor 1. The magnitude of the voltage corresponds to the magnitude of the magnetic field that is converted. The converted voltage is amplified to have a predetermined level by the amplifying unit 2. Then, the amplified voltage is input to the A/D converting unit 3.

Further, in response to the value of the magnetic field being converted into the voltage, as the value includes an offset greater than a signal, the offset is reduced through chopping by the chopping control unit 4.

An output of the A/D converting unit 3 is a value including 2-axis or 3-axis data, and the value is separated into a 2-axis magnetic field of X and Y axes or a 3-axis magnetic field of X, Y, and Z axes by the magnetic field separating unit 5.

The separated data may include instantaneous surrounding noise. The instantaneous noise components are removed by the median filter unit 6. The magnetic field inspecting unit 7 may determine whether or not the data from which the instantaneous noise components have been removed is the geomagnetic field. For example, the determination may be performed after the offset are removed using an offset magnetic field value that has been previously calculated.

In response to the determination that the output of the median filter unit 6 is geomagnetic data, an azimuth is calculated using an existing offset value without updating a new offset. For example, in the event that the output of the medium filter unit 6 is inside a circle in FIG. 3, the output is determined to correspond to geomagnetic field. In the event that it is determined that the output does not correspond to the geomagnetic field, the offset calculation data selecting unit 8 may select data for calculating the offset, and then the sensitivity and offset correction calculating unit 9 may calculate the offset. In this example, the offset can be calculated by using only the three data items. However, in another example, additional data items may be used to calculate the offset.

Accordingly, the azimuth calculating unit 10 may calculate an accurate azimuth by using the calculated offset.

Figure 2:
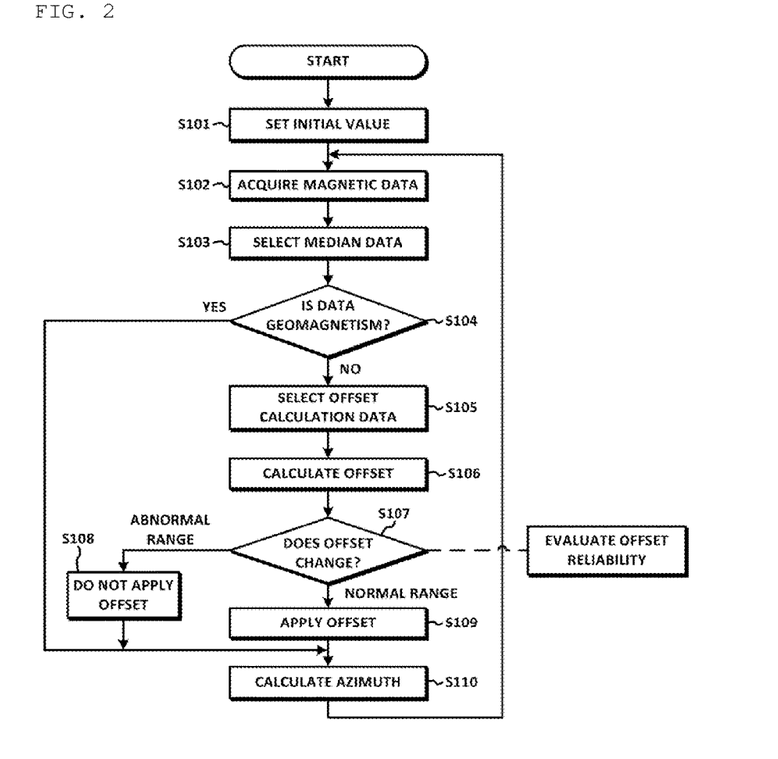
FIG. 2 is a flowchart illustrating an example of an azimuth calculating method.

FIG. 2 is a flowchart illustrating an example of an azimuth calculating method.

Referring to FIG. 2, in the azimuth calculating method according to one example, a system is first started to set an initial value in S101, and magnetic field data is acquired in S102.

That is, a value of the applied magnetic field is converted into a voltage through the magnetic sensor 1, and the converted voltage is amplified to have a predetermined level by the amplifying unit 2. The amplified voltage is input to the A/D converting unit 3. Further, when the value of the magnetic field is converted into the voltage, the offset is reduced through a chopping operation by the chopping control unit 4. Furthermore, an output of the A/D converting unit 3 is a value including 3-axis data, and the value is separated into a 3-axis magnetic field of X, Y, and Z axes by the magnetic field separating unit 5. The data that has been separated into the 3-axis magnetic field includes instantaneous surrounding noise, and the instantaneous noise components can be removed by the median filter unit 6.

Next, the median filter unit 6 arranges data items that have been sequentially input in order of size, and then selects the middle data item from among the whole data items in S103.

For example, assuming that the total number of data items is five, and the sequentially input data items are 5, 8, 8, 3, and 6. When the data items are arranged in order of size, the data items are 8, 8, 6, 5, and 3. A data item to be selected by the median filter unit 6 is the midmost data item. The median item may determined by using the equation [(total number of data items)+1]/2. In this example, the third value is the value in the middle. The third data item counted from the largest data item is 6. Thus, 6 is selected.

By selecting the midmost data, the instantaneous noise components can be removed, and the most stable data item can be selected from among a collected data group. Because the selected data item is used to calculate the offset, it is possible to improve accuracy in the offset calculation.

Thereafter, the magnetic field inspecting unit 7 determines whether or not the output is the geomagnetic field in S104. In this example, the determination is performed after the offset is removed using the previously calculated offset magnetic field value.

Next, a determination as to whether or not the output is the geomagnetic field is carried out using a dip angle with respect to Z-axis in XY plane and magnitudes of the magnetic field in the X, Y, and Z axes. For example, in Korea, a dip angle with respect to a Z-axis is 45 degrees, and the geomagnetic field has a magnitude of about 50 μT. In the event that it is determined that the value of the measured magnetic field is the geomagnetic field on the basis of such reference values, the azimuth calculation is carried out without calculating the offset. Meanwhile, in the event that it is determined that the value of the measured magnetic field is not the geomagnetic field, the data for calculating the offset is selected in S105.

That is, in the event that it is determined that the output of the median filter unit 6 is the geomagnetic field, the azimuth calculation is carried out without updating a new offset. On the other hand, in the event that the output of the median filter unit 6 is not the geomagnetic field, the offset calculation data selecting unit 8 selects the data for calculating the offset, and then the sensitivity and offset correction calculating unit 9 calculates the offset. In this example, the offset can be calculated by using only three data items.

However, although three data items are used to calculate the offset in this example, three or more data items may be used in order to improve accuracy in another example.

In one example, the offset is calculated using at least three data items selected to calculate the offset in S106.

After the offset is calculated using the selected at least three data items, a range of variation in the offset is determined in S107.

As a result of the determination, in the event that the offset is within a reliable level, namely, within a range of a preset reference value, the offset is applied and updated with a new value. In the event that the offset is outside the range of the reference value, the offset is not applied, and the azimuth is calculated without updating the offset, namely, by applying the previous offset, as in S108 to S110.

Figure 3:
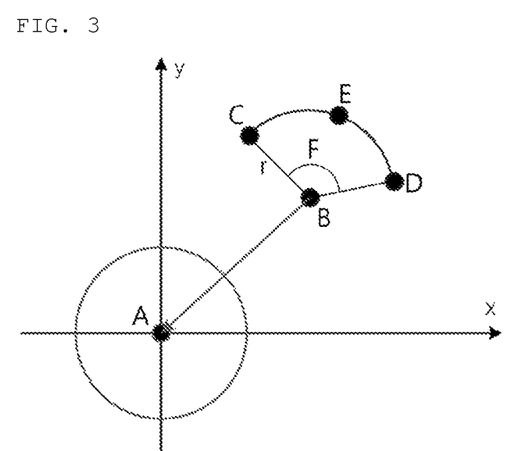
FIG. 3 is a conceptual diagram illustrating an example of a measured data group according to a variation in offset.

FIG. 3 is a conceptual diagram illustrating a measured data group according to the variation in the offset. FIG. 3 illustrates data measured by using a changed offset reference point. In the drawing, symbol A denotes an offset value when the measured magnetic field is within a range of the geomagnetic field, and symbol B denotes a changed offset value. Symbols C and D denote main-calculation data, and symbol E denotes sub-calculation data. Symbol F denotes an angle formed by C, B, and D, and the angle F is in a range of 90° to 180°. Symbol r denotes a distance between the changed offset value B and the measured data group, and this value is a value of the geomagnetic field. In the present invention, the changed offset value B can be calculated using values of the C, D, E, and r. Hereinafter, a method of selecting at least three data items for calculating the offset will be described with reference to the accompanying drawings.

The offset calculation data selecting unit 8 uses two values, that is, a value having the greatest difference in distance between data items in the measured data group and a value having the second largest difference in the distance between data items, as main-calculation data items, and uses at least one data item between the two values as sub-calculation data. To achieve this, a certain number of 2-axis or 3-axis data items are first stored, and an operation of the following set of equations 1 is carried out using the stored plurality of data items.

$$X_{diff} = X_{max} - X_{min},$$

$$Y_{diff} = Y_{max} - Y_{min},$$

$$X_{avg} = (X_{max} + X_{min})/2,$$

$$Y_{avg} = (Y_{max} + Y_{min})/2. \quad \text{[Equation Set 1]}$$

In this set of equations, $X_{max}$, $X_{min}$, $Y_{max}$, and $Y_{min}$ represent output values of the median filter unit, while $X_{avg}$, and $Y_{avg}$ represent average values. The output data items are arranged in order of size of X values, and the largest value is selected as $X_{max}$ and the smallest value is selected as $X_{min}$. The output data items are sorted in order of size of Y values, and the largest value is selected as $Y_{max}$ and the smallest value is selected as $Y_{min}$.

In the event that the $X_{diff}$ is larger than the $Y_{diff}$, the two main-calculation data items are Xmax and Xmin, and the sub-calculation data item is a value closest to the $X_{avg}$. Meanwhile, in the event that the $X_{diff}$ is smaller than the $Y_{diff}$, the two main-calculation data items are $Y_{max}$ and $Y_{min}$, and the sub-calculation data item is a value closest to the $Y_{avg}$.

Figure 4:
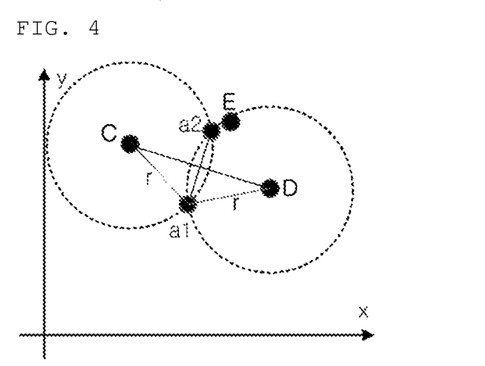
FIG. 4 is a conceptual diagram illustrating an example of a method of calculating an offset by using three selected data items.

FIG. 4 is a conceptual diagram illustrating a method of calculating the off set by using the selected three data items, and the method of calculating the off set by using the selected at least three data items will be described in detail with reference to the illustrated drawing.

The sensitivity and offset correction calculating unit 9 sets a value, which is far away from the sub-calculation data, of intersecting points of two circles having the two main-calculation data items as their centers and each having a radius r, as a new offset reference point.

That is, in the drawing, symbols C and D denote the selected main-calculation data items, and symbol E denote the selected sub-calculation data. Since a distance between the changed offset reference point B and the C and a distance between the changed offset reference point B and D are r (the geomagnetic field), one of intersecting points a1 and a2 of a circle having the C as its center and the radius r and a circle having the D as its center and the radius r becomes an offset reference point.

In the event that the coordinates of the C are set to $X_1$ and $Y_1$, the coordinates of the D are set to $X_2$ and $Y_2$, the coordinates of the B are $^OX$ and $^OY$, and the coordinates of the E are $X_3$ and $Y_3$, the following equations 2 and 3 are represented below.

$$(X_1 - {}^OX)^2 + (Y_1 - {}^OY)^2 = r^2 \quad \text{[Equation 2]}$$

$$(X_2 - {}^OX)^2 + (Y_2 - {}^OY)^2 = r^2 \quad \text{[Equation 3]}$$

The above-described equations 2 and 3 are quadratic equations with the $^OX$ and $^OY$ as variables and have two roots. Thus, the a1 and a2 are roots of the equations, and among them, the root father from the sub-calculation data E, that is, the a1 becomes a new offset reference point.

Figure 5:
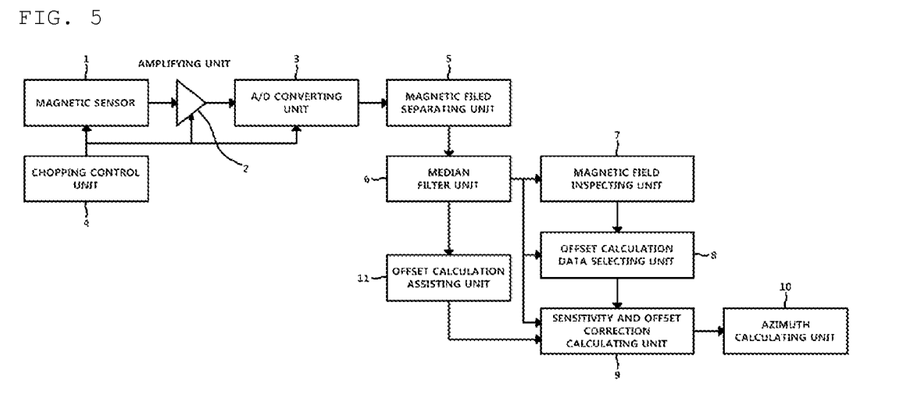
FIG. 5 is a block diagram illustrating another example of an azimuth calculating apparatus.
Figure 6:
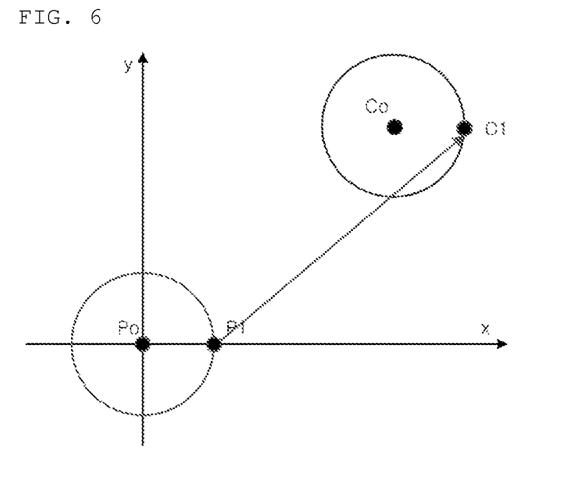
FIG. 6 is a conceptual diagram for describing an offset calculation assisting method in accordance with FIG. 5.

FIG. 5 is a block diagram illustrating an azimuth calculating apparatus according to another example, and FIG. 6 is a conceptual diagram for describing an offset calculation assisting method according to FIG. 5.

Referring to FIG. 5, the azimuth calculating apparatus includes a magnetic sensor 1, an amplifying unit 2, an A/D converting unit 3, a chopping control unit 4, a magnetic field separating unit 5, an median filter unit 6, a magnetic field inspecting unit 7, a offset calculation data selecting unit 8, a sensitivity and offset correction calculating unit 9, and an azimuth calculating unit 10. The configuration including such units is the same as that in the example of azimuth calculating apparatus described in reference to FIG. 1. Thus, a detailed description thereof will be omitted for conciseness.

However, the example of azimuth calculating apparatus illustrated in FIG. 5 further includes an offset calculation assisting unit 11. Thus, it is possible to improve a response speed in calculating an azimuth by roughly changing a reference point before an offset is calculated by geometrical and probabilistic methods and then calculating the offset. Furthermore, in response to only an offset value being changed without changing the azimuth, it is possible to calculate an accurate azimuth without calculating a new offset.

In the event that it is determined that data which is presently measured is not the geomagnetic field and the previous data is the geomagnetic field, the offset calculation assisting unit 11 calculates an offset by subtracting a difference between the present data and the previous data from the previous offset reference point and setting the resultant value as a new offset reference point.

That is, referring to FIG. 6, in the event that the presently measured data is represented as $C_1(X_c, Y_c)$ and the previously measured data is represented as $P_1(X_p, Y_p)$, and also if it is determined that the $P_1$ is the geomagnetic field and the $C_1$ is not the geomagnetic field, the offset is calculated after $(X_c - X_p)$ and $(Y_c - Y_p)$ are subtracted from the offset reference point by using the equation, $(X_c - X_p)^2 + (Y_c - Y_p)^2 > a^2$, and the resultant value is used as a new offset reference point. The value "a" is a value variable depending on the circumstances.

In this example, in the event that a is set to be zero (0), an assist offset calculation is constantly performed, and in the event that a is set to be a value equal to or greater than twice the geomagnetic field (r), the assist offset calculation is carried out only when a rapid change in the offset occurs.

According to the examples of azimuth calculating apparatuses having the configurations described above and the azimuth calculating methods described above, by acquiring a certain number of data items and calculating the offset by an geometrical method other than a conventional probabilistic calculation method, the amount of usage of a memory can be reduced, and the computation amount for calculating the offset and acquiring the data can be reduced. Thus, it is possible to more quickly calculate the offset.

In addition, by removing the noise components by the median filter unit, it is possible to improve reliability of the data used in the offset calculation, so that a precise offset value can be calculated. Moreover, since the offset calculation assisting unit is used, by roughly changing the reference point before the offset is calculated by geometrical and probabilistic methods and then calculating the offset, it is possible to improve the response speed in calculating the azimuth. In the examples in which only the offset value is changed without changing the azimuth, it is also possible to calculate an accurate azimuth without calculating a new offset.

The examples described in the present disclosure may be also implemented through a computer readable code, computer instructions and the like, and such computer readable code or instructions may be recorded on a medium, such as a non-transitory computer readable medium, to control at least one processing element of a computer or a computing system. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus comprising:
   a magnetic sensor configured to sense a magnetic field and convert the sensed magnetic field into a voltage;
   an amplifier configured to amplify the voltage;
   an analog-to-digital converter configured to convert the amplified voltage into voltage data; and
   a processor configured to execute instructions stored in a memory, thereby configuring the processor to:
      separate the voltage data into 3-axis magnetic field components in X, Y and Z axes to generate separated voltage data;
      remove noise components of the separated voltage data by creating a median value of the separated voltage data and filtering the separated voltage data by selecting midmost voltage data;
      apply a previously calculated offset to the filtered separated voltage data;
      determine, based on the application of the previously calculated offset, whether the filtered separated voltage data correspond to a geomagnetic field;
      selectively, based on a result of the determining of whether the filtered separated voltage data correspond to the geomagnetic field,
         select offset data items from the filtered separated voltage data,
         subtract a difference between the filtered separated voltage data and previously measured voltage data from a previous offset reference point,
         set a resultant value as a new offset reference point, in response to the filtered separated voltage data being determined not to correspond to the geomagnetic field and the previously measured voltage data being determined to correspond to the geomagnetic field, and
         calculate an offset by a geometrical method that uses the selected offset data items and the new offset reference point; and
      determine a location or directional information of the apparatus based on the voltage data for the sensed magnetic field and selectively one of the calculated offset and the previously calculated offset, with increased location or directional determination speed and/or accuracy with respect to a presence of an abnormal magnetic field.

2. The apparatus according to claim 1, wherein the processor is further configured, through the execution of the instructions, to remove an instantaneous noise from measurements of the magnetic field.

3. The apparatus according to claim 1, wherein the processor is further configured, through the execution of the instructions, to select at least three data items as the selected offset data items, including two distant X or Y axis voltage data items and an X or Y voltage data item between the two distant voltage data items.

4. The apparatus according to claim 3, wherein the processor is further configured, through the execution of the instructions, to use two values, which are a value having the greatest difference in distance between data items in a measured data group and a value having the second greatest difference, as main-calculation data items, and
   wherein, when arranged in order of X values, a data item between the two values is used as sub-calculation data.

5. The apparatus according to claim 4, wherein the processor is further configured, through the execution of the instructions, to set one point that is farther from the sub-calculation data, among intersecting points of two circles having the two main-calculation data items as centers and each having a radius r, as the calculated offset.

6. The apparatus according to claim 1,
wherein the determining of the location or directional information of the apparatus includes, based on a result of the determining of whether the filtered separated voltage data correspond to the geomagnetic field,
determining the location or directional information based on the previously calculated offset, without performing the selecting of the offset data items, the subtracting of the difference, the setting of the resultant value, and the calculating of the offset, in response to determining that the magnetic field is the geomagnetic field, and
determining the location or directional information based on the calculated offset in response to determining that the magnetic field is not the geomagnetic field.

7. The apparatus according to claim 1, wherein the filtered separated voltage data that is presently measured is represented as $C_1(X_c, Y_c)$ and the filtered separated voltage data which is previously measured is represented as $P_1(X_p, Y_p)$, and in response to a determination that the $P_1$ is the geomagnetic field and the $C_1$ is not the geomagnetic field, the processor is controlled to subtracts a difference between the $C_1(X_c, Y_c)$ and the $P_1(X_p, Y_p)$ from the previously calculated offset and set a resultant value as the new offset reference point.

8. The apparatus according to claim 1, wherein the determination of whether the filtered separated voltage data correspond to the geomagnetic field is based on consideration of a dip angle with respect to the Z axis in the XY plane and magnitudes of the magnetic field in the X, Y, and Z axes.

9. A processor-implemented method of determining a location or directional information of an apparatus comprising a magnetic sensor, an amplifier, an analog-to-digital converter, and a processor, the method comprising:
sensing, using the magnetic sensor, a magnetic field and converting the sensed magnetic field into a voltage;
amplifying, using the amplifier, the voltage;
converting, using the analog-to-digital converter, the amplified voltage into voltage data;
controlling, through execution by a processor of instructions stored in a memory, the processor to:
separate the voltage data into 3-axis magnetic field components in X, Y and Z axes to generate separated voltage data;
remove noise components of the separated voltage data by creating a median value of the separated voltage data and filtering the separated voltage data by selecting midmost voltage data;
apply a previously calculated offset to the filtered separated voltage data;
determine, based on the application of the previously calculated offset, whether the filtered separated voltage data correspond to a geomagnetic field;
selectively, based on a result of the determining of whether the filtered separated voltage data correspond to the geomagnetic field,
select offset data from the filtered separated voltage data which do not correspond to the geomagnetic field,
subtract a difference between the filtered separated voltage data and previously measured voltage data from the previously calculated offset and setting a resultant value as a new offset reference point, in response to the previously measured voltage data being determined to correspond to the geomagnetic field, and
calculate an offset by using the selected offset data and the new offset reference point; and
determine a location or directional information of the apparatus based on the voltage data for the sensed magnetic field and selectively one of the calculated offset, another calculated offset, and the previously calculated offset, with increased location or directional determination speed and/or accuracy with respect to a presence of an abnormal magnetic field,
wherein, when the filtered separated voltage data does not correspond to the geomagnetic field, the location or directional information of the apparatus is determined based on the voltage data for the sensed magnetic field and the calculated offset in response to a determination that the calculated offset is within a set range of a reference point, and determined based on the voltage data for the sensed magnetic field and the other calculated offset, calculated by a geometrical method that uses the previously calculated offset, in response to a determination that the calculated offset is outside the set range of the reference point.

10. The method according to claim 9, wherein, in the selecting of the offset data, two values, which are a value having the greatest difference in distance between data items in a measured data group and a value having the second greatest difference, are used as main-calculation data items, and
wherein, when arranged in order of X values, a data item between the two values is used as sub-calculation data.

11. The method according to claim 10, wherein in the selecting of the offset data, data items that are sequentially input are sorted in order of magnitude, and a middle data item of the arranged data items is selected to remove a noise.

12. The method according to claim 10, wherein the selected offset data items comprise at least three data items.

13. The method according to claim 12, wherein the selecting of the three data items comprises:
storing a number of 2-axis or 3-axis data items;
calculating $X_{diff}$ and $Y_{diff}$ by performing an operation of the following equations by using the stored data items;
selecting two of the stored data items having the largest value and the second largest value from among the $X_{diff}$ and the $Y_{diff}$ and selecting the two of the stored data items as main-calculation data items C and D,
wherein if the $X_{diff}$ is selected when the $X_{diff}$ is larger than the $Y_{diff}$, the selected two of the stored data items are Xmax and Xmin, and
wherein if the $Y_{diff}$ is selected when the $X_{diff}$ is smaller than the $Y_{diff}$, the selected two of the stored data items are Ymax and Ymin;
in response to the $X_{diff}$ being selected, selecting data having an X value closest to $X_{avg}$, and in response to the $Y_{diff}$ being selected, selecting data having a Y value closest to $Y_{avg}$; and
selecting the data selected as the data having an X value closest to $X_{avg}$ or the data having a Y value closest to $Y_{avg}$ as sub-calculation data E, in accordance with equations:

$$X_{diff}=X_{max}-X_{min},$$

$$Y_{diff}=Y_{max}-Y_{min},$$

$$X_{avg}=(X_{max}+X_{min})/2,$$

$$Y_{avg}=(Y_{max}+Y_{min})/2,$$

wherein $X_{max}$, $X_{min}$, $Y_{max}$, and $Y_{min}$ are output values of the median filter, and $X_{avg}$ and $Y_{avg}$ are average values.

14. The method according to claim 13, wherein the calculating of the offset, by using the selected three data items, comprises:

forming a circle having the main-calculation data C as a center and a radius r and a circle having the main-calculation data D as a center and the radius r, where one point of intersecting points a1 and a2 of the circles as correspond to a changed offset reference point B, such that with coordinates of the main-calculation data C being $X_1$ and $Y_1$, coordinates of the main-calculation data D being $X_2$ and $Y_2$, coordinates of the changed offset reference point B being $^OX$ and $^OY$, and coordinates of the sub-calculation data E being $X_3$ and $Y_3$, the coordinates of the changed offset reference point B are calculated according to the following equations:

$$(X_1-{}^OX)^2+(Y_1-{}^OY)^2=r^2; \text{ and}$$

$$(X_2-{}^OX)^2+(Y_2-{}^OY)^2=r^2,$$

wherein a1 and a2 are roots of the equations, and among the roots, a root farther from the sub-calculation data E is set as the changed offset reference point B, and set as the calculated offset.

15. The method according to claim 10, wherein the filtered separated voltage data that is presently measured is represented as $C_1(X_c, Y_c)$ and the filtered separated voltage data which is previously measured is represented as $P_1(X_p, Y_p)$, and in response to a determination that the $P_1$ is the geomagnetic field and the $C_1$ is not the geomagnetic field, the processor is controlled to subtracts a difference between the $C_1(X_c, Y_c)$ and the $P_1(X_p, Y_p)$ from the previously calculated offset and sets a resultant value as the new offset reference point.

16. The method according to claim 10, wherein the method further comprising controlling the magnetic sensor to sense the magnetic field for obtaining the voltage data.

17. A processor-implemented method of determining a location or directional information of an apparatus comprising a magnetic sensor, an amplifier, an analog-to-digital converter, and a processor, the method comprising:

sensing and measuring, using the magnetic sensor, a magnetic field and converting the sensed and measured magnetic field into a voltage;

amplifying, using the amplifier, the voltage;

converting, using the analog-to-digital converter, the amplified voltage into voltage data; and controlling, through execution by a processor of instructions stored in a memory, the processor to:

separate the voltage data into 3-axis magnetic field components in X, Y and Z axes to generate separated voltage data;

remove noise components of the separated voltage data by creating a median value of the separated voltage data, and filtering the separated voltage data by selecting midmost voltage data;

apply a previously calculated offset to the filtered separated voltage data;

determine, based on the application of the previously calculated offset, whether the filtered separated voltage data correspond to a geomagnetic field;

selectively, based on a result of the determining of whether the filtered separated voltage data correspond to the geomagnetic field, select offset data items for calculating an offset from the filtered separated voltage data, select a median value or a value in a midmost position of data in a collected data group, arranged in order of magnitude to form a measured data group, subtract a difference between the filtered separated voltage data and previously measured voltage data from the previously calculated offset and setting a resultant value as a new offset reference point, in response to the filtered separated voltage data being determined not to correspond to the geomagnetic field and the previously measured voltage data being determined to correspond to the geomagnetic field, and calculate the offset by applying a geometric method to the selected offset data item and the new offset reference point; and determine a location or directional information of the apparatus based on the voltage data for the sensed magnetic field and selectively one of the calculated offset and the previously calculated offset, with increased location or directional determination speed and/or accuracy with respect to a presence of an abnormal magnetic field.

18. The method according to claim 17, wherein the controlling of the processor further comprises controlling the processor to:

separate the voltage data into components along two or more axes to obtain a collected data group.

19. The method according to claim 17, wherein the selecting of the median value or the value in the midmost position of the data in the collected data group comprises selecting two values having the greatest difference and the second greatest difference in distance between data items in a measured data group, and further selecting the value between the two values.

20. A non-transitory computer-readable storage medium storing instructions that, when executed by a processor, cause the processor to perform the method of claim 17.

* * * * *